Dec. 19, 1967   A. D. ARGOUDELIS ET AL   3,359,163
ANTIBIOTIC LINCOMYCIN C AND A PROCESS FOR PREPARING THE SAME
Filed March 25, 1964   3 Sheets-Sheet 2
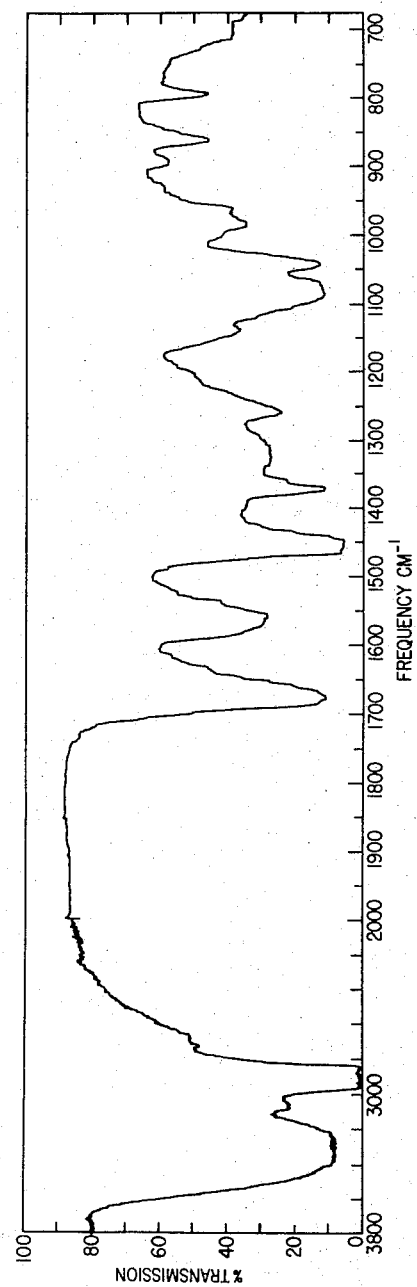
FIGURE II
INFRARED SPECTRUM OF LINCOMYCIN C HYDROCHLORIDE CRYSTALLINE FORM I
A. D. ARGOUDELIS
D. J. MASON
INVENTORS
BY
ATTORNEYS

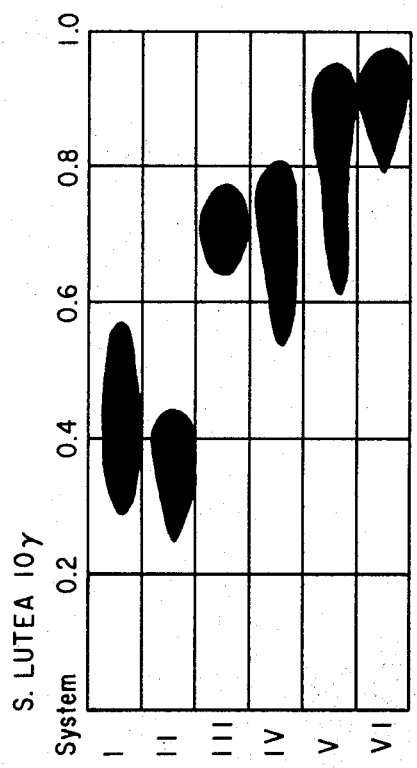

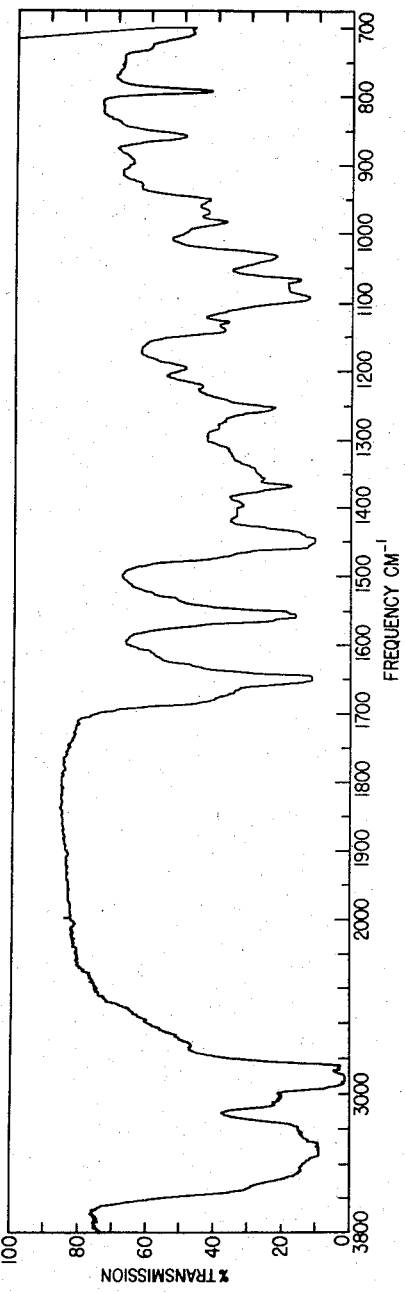

3,359,163
ANTIBIOTIC LINCOMYCIN C AND A PROCESS
FOR PREPARING THE SAME
Alexander D. Argoudelis, Kalamazoo, and Donald J. Mason, Portage, Mich., assignors to The Upjohn Company, Kalamazoo, Mich., a corporation of Delaware
Filed Mar. 25, 1964, Ser. No. 354,652
12 Claims. (Cl. 167—65)

ABSTRACT OF THE DISCLOSURE

Antibiotic lincomycin C produced by adding ethionine to a lincomycin fermentation. Lincomycin C is active against *S. aureus* and *E. coli* and can be used to inhibit these bacteria when actinomycetes are isolated from soil samples.

---

This invention relates to a novel composition of matter and to a process for the production thereof. More particularly this invention relates to a new compound, lincomycin C (U–11,921A), and to a process for the production thereof.

Lincomycin C is a biosynthetic product produced by a lincomycin-producing actinomycete when ethionine is added to the fermentation described in Example 1 of U.S. Patent 3,086,912 for the production of lincolnensin, also called lincomycin.

Lincomycin C is a basic compound and has the same antibacterial spectrum as lincomycin, though in a greater degree. Therefore, it can be used in the same manner as lincomycin. For example, it is useful in wash solutions, for sanitation purposes, as in the washing of hands and cleaning of equipment, floors, or furnishings of contaminated rooms; it is also useful as an industrial preservative, for example, as a bacteriostatic rinse for laundered clothes and for impregnating paper and fabrics; and it is useful for suppressing the growth of sensitive organisms in plate assays, and other biological media. It can also be used as a feed supplement to promote the growth of mammals and birds, either alone or in combination with other antibiotics.

Lincomycin and lincomycin C are similar in many respects, such as, both antibiotics have one basic titratable group with similar pKa values and very close equivalent weights; both antibiotics do not show any absorption in the UV region, and both have the same solubility properties. However, they are demonstrably different compounds as shown by thin-layer chromatography using a solvent system consisting of methyl ethyl ketone, acetone, water (150:50:20).

Procedures such as counter current distribution and Florisil chromatography (a synthetic silicate of the type described in U.S. Patent 2,393,625 and sold by the Floridin Company) were employed to isolate quantities of lincomycin C from crude preparations.

The novel compound of the invention can be produced in a fermentation as described in Example 1, U.S. Patent 3,086,912 when an effective amount of ethionine ranging from more than incidental impurities up to 4 mg./ml. of fermentation medium is used. The addition of either D-ethionine or DL-ethionine to the medium results in the production of lincomycin C, but the addition of L-ethionine to the medium is preferred when greater quantities of lincomycin C are desired.

Whichever ethionine is used, there is present a certain amount of toxicity to the growth of the microorganism which may reduce the ultimate yield of lincomycin C in the fermentation. This toxicity can be minimized by feeding the ethionine to the fermentation when it is about 24 to 48 hours old. The feeding can be done continuously, semi-continuously or by other means as long as the concentration of ethionine in the fermentation medium does not affect the growth of the microorganism to the point where the production of lincomycin C suffers. The toxic level of ethionine will vary with equipment and media used, but in general, a level at any particular time during the fermentation less than about 200 mcg./ml. of fermentation medium is not toxic.

The new compound of the invention is a nitrogenous base having the molecular formula $C_{19}H_{36}N_2O_6S$. It is monobasic, has a pKa of about 7.73, and under ordinary conditions is more stable in the protonated, that is, salt form. It is soluble in lower-alkanols, e.g., methanol, ethanol, isopropanol, butanols, and the like; lower-alkyl esters of lower-alkanoic acids, e.g., ethyl acetate, butyl acetate, amyl acetate, and the like; lower-alkanones, e.g., acetone, methyl ethyl ketone, isopropyl butyl ketone, and the like; and chlorinated lower-alkanes, e.g., methylene chloride, chloroform, ethylene dichloride, and the like. It has some solubility in water but can be extracted from aqueous solutions with water-immiscible solvents, e.g., 1-butanol, butyl acetate, methylene chloride, and the like.

Lincomycin C can be recovered from a lincomycin fermentation to which ethionine has been added by employing the recovery procedures disclosed in U.S. Patent 3,086,912. A preferred method for the recovery of lincomycin C is to utilize surface active adsorbents, for example, decolorizing carbon, or decolorizing resins, and eluting the adsorbed material with a solvent. Any of the solvents mentioned above can be used. A suitable decolorizing resin is Permutit DR (U.S. Patent 2,702,263). The whole beer is filtered as disclosed in U.S. Patent 3,086,-912 before passage of the beer over the surface active adsorbent. The eluates are evaporated to dryness and the residue is extracted with a water-immiscible solvent from which the new compound and lincomycin are recovered. If desired, both antibiotics can be converted to the protonated form. Further procedures are necessary to effect a separation of lincomycin and lincomycin C. Preferred procedures are counter current distribution and Florisil chromatography, though others such as silica gel chromatography and partition column chromatography can also be used.

Fractional liquid-liquid extraction is accomplished in partition chromatographic columns or in a counter current distribution apparatus using solvent systems such as cyclohexane-methyl ethyl ketone-pH 10 buffer (7:3:2) and 1-butanol-water (1:1).

Recrystallization is accomplished by dissolving the crystalline salt in water, adding a water-miscible solvent, e.g., acetone, methanol, ethanol, or 2-propanol, and cooling to induce or complete crystallization. The crystals are filtered and washed with aqueous solvent and, if desired, by anhydrous solvent and then vacuum dried.

The new compound of the invention can also be recovered from the filtered beer by adsorption on cation exchange resins. Both the carboxylic and sulfonic acid types can be used. (Suitable carboxylic acid resins include the polyacrylic acid resins obtained by the copolymerization of acrylic acid and divinylbenzene by the procedure given on page 87 of Kunin, Ion Exchange Resins, 2nd ed., (1958), John Wiley and Sons, Inc. Carboxylic acid cation exchange resins of this type are marketed under the tradenames Amberlite IRC–50, and Zeokarb 226. Suitable sulfonic acid resins include nuclear sulfonated polystyrene resins cross-linked with divinylbenzene which are obtained by the procedure given on page 84 of Kunin, supra. Sulfonated cation exchange resins of this type are marketed under the trade names Dowex 50, Amberlite IR–120, Nalcite HCR, Chempro C–20, Permutit Q, and Zeokarb 225.)

The antibiotic is eluted from the resin with an acid, advantageously at a pH lower than the pKa of the cation exchange resin used. Satisfactory results are obtained with a pH of about 1 to 6. The eluate is adjusted to about pH 7.5 to 8.5 with a base, e.g., sodium hydroxide, or a strongly basic anion exchange resin. (Suitable anion exchange resins for this purpose are obtained by chloromethylating by the procedure given on pages 88 and 97 of Kunin, supra, polystyrene cross-linked, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the trade names Dowex 2, Dowex 20, Amberlite IRA–400, Duolite A–102, and Permutit S–1.)

The novel compound of the invention can be purified by successive transfers from protonated to non-protonated forms and vice versa, especially with other types of treatments intervening, as for example, solvent extractions and washings, chromatography and fractional liquid-liquid extractions. In this manner salts of lincomycin C can be employed to isolate or upgrade the antibiotic. For example, the antibiotic can be converted to an insoluble salt, such as the picrate, which can be subjected to purification procedures and then used to regenerate the antibiotic free base by treatment with alkali. Or the antibiotic can be converted to a water-soluble salt, such as the hydrochloride or sulfate, and the aqueous solution of the salt extracted with various water-immiscible solvents before regenerating the antibiotic free base by treatment with alkali of the thus-extracted acid solution.

Salts of lincomycin C can be used for the same biological purposes as the free base or they can be employed to upgrade the antibiotic as previously described.

Specific acid salts can be made by neutralizing the free base with the appropriate acid to below about pH 7.0, and advantageously to about pH 2 to pH 6. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

The new compound of the invention has been isolated in two crystalline forms. Crystals which precipitated in the form of needles were designated as Form I and crystals in the form of cubes were designated as Form II. The infrared spectrum of Form I resemblies that of Form I of lincomycin hydrochloride, whereas the infrared spectrum of Form II resembles that of Form II of lincomycin hydrochloride.

The new compound of the invention, which includes both crystalline Forms I and II, is active against bacteria, for example, *Streptococcus lactis,* which causes the souring of milk, and can be used to prevent or delay the souring of dairy products, for example, milk and cheese. Concentrations as low as 0.8 mg./ml. can be used. The new compound can also be used to inhibit gram-positive, sporeformer spreaders on agar plates when isolating molds, yeasts, actinomycetes, and gram-negative organisms. It can be used, for example, in the isolation of microorganisms in soil samples as well as in the isolation of gram-negative organisms, for example, Pseudomonas, Proteus, and *Escherichia coli* from mixed infections in the presence of Staphylococci and/or Streptococci. The new compound of the invention is also active against *Staphylococcus aureus* 552 and *S. aureus* 771 which are resistant to penicillin, sterptomycin, tetracycline, and erythromycin.

The following examples are illustrative of the process and products of the present invention, but are not to be construed as limiting. All percentages are by weight and all solvent mixture proportions are by volume unless otherwise noted.

EXAMPLE 1

Lincomycin C

*Fermentation.*—A soil slant of *Streptomyces linocolnensis* var. *lincolnensis,* NRRL 2936, was used to inoculate a series of 500-ml. Erlenmeyer flasks each containing 100 ml. of seed medium consisting of the following ingredients:

| | |
|---|---|
| Yeastolac [a] | g-- 10 |
| Glucose monohydrate | g-- 10 |
| N-Z-amine B [b] | g-- 5 |
| Tap water q.s., 1 liter. | |

[a] Yeastolac is a protein hydrolysate of yeast cells.
[b] N-Z-amine B is Sheffield's enzymatic digest casein.

The seed medium presterilization pH was 7.3. The seed was grown for 2 days at 28° C. on a Gump rotary shaker operating at 250 r.p.m.

A 5% inoculum of the seed described above (5 ml.) was added to each of 30 500-ml. Erlenmeyer flasks each containing 100 ml. of the following fermentation medium:

| | |
|---|---|
| Glucose monohydrate | gm-- 15 |
| Starch | gm-- 40 |
| Molasses | gm-- 20 |
| Wilson's Peptone Liquor No. 159 [a] | gm-- 10 |
| Corn steep liquor | gm-- 20 |
| Calcium carbonate | gm-- 8 |
| Lard oil | ml-- 0.5 |
| Tap water, q.s., 1 liter. | |

[a] Wilson's Peptone Liquor No. 159 is a preparation of enzymatically hydrolyzed proteins from animal origin.

At the time of inoculation, DL-ethionine was added to a final concentration of 2 mg./ml.

The shake flasks were harvested after 4 days of fermentation at 28° C. on a Gump rotary shaker at 250 r.p.m. They assayed 200 mcg./ml. on the *S. lutea* assay, hereinafter described. The whole beer solids was about 20 gm./liter.

In a similar manner, fermentations were run with L-ethionine substituted for DL-ethionine, and D-ethionine substituted for DL-ethionine.

*Purification.*—Whole beer (235 liters) from a DL-ethionine fermentation was filtered at harvest pH using a filter aid as required. The mycelial cake was washed with water and the cake was then discarded. The filtered beer and water wash (275 liters) was stirred for 45 minutes with 12.5 kg. of activated carbon and 2.5 kg. of diatomaceous earth. The mixture was filtered and the filtrate was discarded. The carbon cake was washed with 60 liters of water and the water wash was discarded. The cake was washed with 70 liters of 20% aqueous acetone and the 20% aqueous acetone wash was discarded. The cake was then eluted twice with 100 liter portions of 90% aqueous acetone. The eluates were combined (215 liters) and the solution was concentrated (18 liters). This concentrate was adjusted to pH 10.0 with a 50% aqueous sodium hydroxide solution and extracted three times with 20 liter portions of methylene chloride. The methylene chloride extracts were combined (60 liters) and then concentrated to give an oily preparation (7.14 g.) containing lincomycin and lincomycin C in equal amounts and both in the free base form. This preparation was then dissolved in 200 ml. of methylene chloride. The solution was clarified by filtration and then concentrated to dryness in vacuo. The residue was dissolved in 100 ml. of 1 N methanolic hydrogen chloride. The methanolic solution was then mixed with 3.2 liters of ether under stirring. The resulting precipitated colorless, crude lincomycin hydrochloride and lincomycin C hydrochloride was isolated by filtration and dried; yield 7.14 g. assaying 940 mcg./mg. against *Sarcina lutea.* (The assey against *Sarcina lutea* is conducted on agar buffered to pH 6–8 with pH 7.0 phosphate buffer [0.1 M]. A unit volume [0.08 ml.] of solution containing the material to be assayed is placed on a 12.7 mm. assay disc which is then placed on an agar plate seeded with the assey microorganism.) Thin layer chromatography showed the presence of both lincomycin hydrochloride and lincomycin C hydrochloride in approximately equal amounts.

EXAMPLE 2

Crude lincomycin C hydrochloride (7.0 g.), as obtained in Example 1, was dissolved in 20 ml. of water and 20 ml. of butanol, pH adjusted to 4.2 with 1 N HCl, and the solution distributed in a counter current distribution apparatus for 1000 transfers. Analysis by thin-layer chromatography showed that the fractions in tubes 135 to 190 contained lincomycin C. These fractions were combined, and the solution was concentrated to an aqueous and freeze dried to give 2.44 gm. of lincomycin C hydrochloride assaying 1400 mcg./mg. against *Sarcina lutea*. Five hundred mg. of this preparation was dissolved in 2 ml. of water, 1 ml. of methanol, and 100 ml. of acetone. The solution was clarified by filtration. The filtrate was mixed with ether until crystals appeared. The mixture was allowed to stand at room temperature for 1 hr. Crystalline (cubes) lincomycin C hydrochloride was separated from the supernatant material solution by decantation. These crystals were recrystallized from one ml. of water, 1 ml. of methanol, 80 ml. of acetone and 20 ml. of ether; yield 250 mg. of crystalline (cubes) lincomycin C hydrochloride. The supernatant (obtained as described above) was allowed to stand at 5° C. for 4 hours. Crystalline (needles) lincomycin C hydrochloride which precipitated was filtered and dried; yield, 150 mg. of crystalline (needles) lincomycin C hydrochloride.

Characterization of lincomycin C hydrochloride

*U.V. absorption spectrum.*—Lincomycin C hydrochloride does not show any absorption maxima in the range of 220–400 m$\mu$.

*Titration.*—Potentiometric titration shows the presence of one basic titratable group with a pKa' of 7.73.

*Solubility.*—Lincomycin C hydrochloride is soluble in water and methanol. It is moderately soluble in 95% ethanol or absolute ethanol and relatively insoluble in acetone, ethyl acetate, chlorinated and saturated hydrocarbon solvents.

*Molecular weight.*—Found 490±20 (by potentiometric titration).

*Papergram.*—The paper chromatographic pattern of lincomycin C hydrochloride in the following solvent systems is as shown in FIGURE I of the drawing:
 (I) 1-butanol, water (84:16), 16 hours.
 (II) 1-butanol, water (84:16)+0.25% p-toluenesulfonic acid, 16 hrs.
 (III) 1-butanol, acetic acid, water (2:1:1), 16 hrs.
 (IV) 2% piperidine (v./v.) in n-butanol, water (84:16), 16 hrs.
 (V) 1-butanol, water (4:96), 5 hrs.
 (VI) 1-butanol, water (4:96)+0.25% p-toluenesulfonic acid, 5 hrs.

The following is a characterization of the two crystal forms, I and II, of lincomycin C hydrochloride:

FORM I

*Crystal appearance.*—Needles.
*Specific rotation.*—$[\alpha]_D^{25}=+140.5°$ (c., 0.427, water).
*Elemental analysis.*—Calculated for

$$C_{19}H_{36}N_2O_6S \cdot HCl \cdot H_2O$$

C, 48.04; H, 8.26; N, 5.90; Cl, 7.46; S, 6.75; O, 23.59. Found: C, 48.02; H, 8.35; N, 6.05; Cl, 7.73; S, 7.03; O, 22.82 (by diff.).

*IR.*—The IR spectrum of lincomycin C hydrochloride crystalline Form I in mineral oil mull, as shown in FIGURE II of the drawing in reciprocal centimeters is as follows:

| | | | |
|---|---|---|---|
| 3300 | (S) | 1210 | (M) |
| 3060 | (S) | 1140 | (M) |
| 2920 | (S) (oil) | 1094 | (S) |
| 2850 | (S) (oil) | 1073 | (S) |
| 2720 | (M) | 1048 | (S) |
| 2340 | (W) | 1000 | (M) |
| 1680 | (S) | 990 | (M) |
| 1568 | (M) | 965 | (M) |
| 1456 | (S) (oil) | 932 | (W) |
| 1375 | (S) | 900 | (W) |
| 1363 | (S) (oil) | 890 | (W) |
| 1333 | (M) | 865 | (M) |
| 1318 | (M) | 795 | (M) |
| 1300 | (M) | 708 | (M) |
| 1262 | (S) | 675 | (M) |
| 1230 | (M) | 660 | (M) |

FORM II

*Appearance of crystals.*—Cubes.
*Specific rotation.*—$[\alpha]_D^{25}=+143°$ (c., 0.620, water).
*Elemental analysis.*—Calculated for

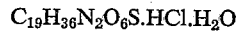

$$C_{19}H_{36}N_2O_6S \cdot HCl \cdot H_2O$$

Found: C, 48.07; H, 8.30; N, 6.48; S, 6.94; Cl, 7.54; O, 22.67 (by diff.).

*IR.*—The IR spectrum of lincomycin C hydrochloride crystalline Form II in mineral oil mull, as shown in FIGURE III of the drawing in reciprocal centimeters is as follows:

| | | | |
|---|---|---|---|
| 3550 | (M) | 1290 | (M) |
| 3440 | (S) | 1260 | (S) |
| 3340 | (S) | 1225 | (M) |
| 3210 | (S) | 1200 | (M) |
| 3070 | (S) | 1145 | (M) |
| 3020 | (S) | 1140 | (M) |
| 2920 | (S) (oil) | 1095 | (S) |
| 2850 | (S) (oil) | 1070 | (S) |
| 2720 | (M) | 1040 | (S) |
| 1673 | (M) | 1000 | (M) |
| 1650 | (S) | 990 | (M) |
| 1610 | (W) | 975 | (M) |
| 1560 | (S) | 960 | (M) |
| 1555 | (S) | 935 | (W) |
| 1535 | (M) | 900 | (W) |
| 1450 | (S) | 865 | (M) |
| 1420 | (M) | 800 | (M) |
| 1400 | (M) | 730 | (W) |
| 1370 | (S) | 715 | (M) |
| 1360 | (M) | 705 | (M) |
| 1345 | (M) | 660 | (M) |
| 1320 | (M) | | |

Band intensities in the above IR spectra are indicated as "S," "M," and "W," respectively, and are approximated in terms of the backgrounds in the vicinity of the bands. An "S" band is of the same order of intensity as the strongest band in the spectrum; "M" bands are between one-third and two-thirds as intense as the strongest band, and "W" bands are less than one-third as intense as the strongest band.

We claim:
1. Lincomycin C, a nitrogenous base, which as the free base is characterized by (a) a molecular formula $C_{19}H_{36}N_2O_6S$; (b) being monobasic and having a pKa of about 7.73; (c) having no absorption in the UV region; (d) being more stable in the salt form than the base form; (e) being soluble in methanol, ethanol, isopropanol, butanol, ethyl acetate, butyl acetate, amyl acetate, acetone, methyl ethyl ketone, isopropyl butyl ketone, methylene chloride, chloroform, and ethylene dichloride; and, in the form of its crystalline hydrochloride Form I by (f) a needle crystalline form; (g) the empirical formula $C_{19}H_{36}N_2O_6S \cdot HCl \cdot H_2O$, and the elemental analysis

Found: C, 48.02; H, 8.35; N, 6.05; S, 7.03; Cl, 7.73; O, 22.82 (by diff.);
(h) an optical rotation $[\alpha]_D^{25} = +140.5°$ (c., 0.427, water); and, (i) a characteristic infrared absorption spectrum in mineral oil mull at the following frequencies expressed in reciprocal centimeters, and as shown in FIGURE II of the drawing: 3300 (S), 3060 (S), 2920 (S) (oil), 2850 (S) (oil), 2720 (M), 2340 (W), 1680 (S), 1568 (M), 1456 (S) (oil), 1375 (S), 1363 (S) (oil), 1333 (M), 1318 (M), 1300 M), 1262 (S), 1230 (M), 1210 (M), 1140 (M), 1094 (S), 1073 (S), 1048 (S), 1000 (M), 990 (M), 965 (M), 932 (W), 900 (W), 890 (W), 865 (M), 795 (M), 708 (M), 675 (M), 660 (M), and, in the form of its crystalline hydrochloride crystal Form II by (j) the empirical formula $$C_{19}H_{36}N_2O_6S \cdot HCl \cdot H_2O$$

and the elemental analysis
Found: C, 48.07; H, 8.30; N, 6.48; S, 6.94; Cl, 7.54; O, 22.67 (by diff.);
(k) an optical rotation $[\alpha]_D^{25} = +143°$ (c., 0.620, water); (l) a cube crystalline form; and, (m) a characteristic infrared absorption spectrum in mineral oil mull at the following frequencies expressed in reciprocal centimeters and as shown in FIGURE III of the drawing: 3550 (M), 3440 (S), 3340 (S), 3210 (S), 3070 (S), 3020 (S), 2920 (S) (oil), 2850 (S) (oil), 2720 (M), 1673 (M), 1650 (S), 1610 (W), 1560 (S), 1555 (S), 1535 (M), 1450 (S), 1420 (M), 1400 (M), 1370 (S), 1360 (M), 1345 (M), 1320 (M), 1290 (M), 1260 (S), 1225 (M), 1200 (M), 1145 (M), 1140 (M), 1095 (S), 1070 (S), 1040 (S), 1000 (M), 990 (M), 975 (M), 960 (M), 935 (W), 900 (W), 865 (M), 800 (M), 730 (W), 715 (M), 705 (M), 660 (M); and in its essentially pure crystalline hydrochloride Forms I and II by (n) a characteristic papergram pattern as shown in FIGURE I of the drawing, and (o) a molecular weight of 490±20 as determined by potentiometric titration.

2. Lincomycin C as defined in claim 1 in its essentially pure form.

3. The hydrochloride of lincomycin C as defined in claim 1.

4. An acid addition salt of lincomycin C as defined in claim 1.

5. A compound according to claim 4 in its essentially pure crystalline form.

6. The hydrochloride according to claim 3 in its essentially pure crystalline form.

7. A process which comprises cultivating Streptomyces lincolnensis var. lincolnensis in an aqueous nutrient medium containing ethionine in an effective amount ranging from more than incidental impurities up to 4 mg./ml. of aqueous nutrient medium, under aerobic conditions until substantial antibacterial activity is imparted to said medum by production of lincomycin C and isolating the lincomycin C so produced.

8. A process according to claim 7 wherein the agueous nutrient medium contains DL-ethionine in an effective amount ranging from more than incidental impurities up to 4 mg./ml. of aqueous nutrient medium.

9. A process according to claim 7 wherein the aqueous nutrient medium contains L-ethionine in an effective amount ranging from more than incidental impurities up to 4 mg./ml. of aqueous nutrient medium.

10. A process according to claim 7 in which the cultivation is effected at a temperature of about 18° C. to about 37° C. for a period between about 2 to 10 days.

11. A process which comprises cultivating Streptomyces lincolnensis var. lincolnensis in an aqueous nutrient medium containing ethionine, in an effective amount ranging from more than incidental impurities up to 4 mg./ml. of aqueous nutrient medium, a source of assimilable carbohydrate and assimilable nitrogen under aerobic conditions until substantial antibacterial activity is imparted to said medium by the production of lincomycin C and isolating the lincomycin C so produced.

12. A process for the recovery of lincomycin C as its hydrochloride salt from a fermentation beer containing lincomycin C and lincomycin which comprises
(1) filtering the fermentation beer,
(2) stirring the filtered beer with carbon and diatomaceous earth to form a slurry,
(3) filtering the slurry to obtain a carbon and diatomaceous earth cake,
(4) eluting the carbon and diatomaceous earth cake with acetone,
(5) freeze drying the eluates,
(6) extracting the freeze-dried eluates with a water-immiscible solvent,
(7) concentrating the extract to a dry solid.
(8) treating the dry solid with hydrochloric acid, and
(9) subjecting the hydrochloric acid-treated dry solid to fractional liquid-liquid extraction to obtain lincomycin C hydrochloride.

References Cited
UNITED STATES PATENTS
3,086,912    4/1963    Bergy et al. _____ 167—65

ALBERT T. MEYERS, Primary Examiner.
D. M. STEPHENS, Assistant Examiner.

UNITED STATES PATENT OFFICE
CERTIFICATE OF CORRECTION

Patent No. 3,359,163                                             December 19, 1967

Alexander D. Argoudelis et al.

It is hereby certified that error appears in the above numbered patent requiring correction and that the said Letters Patent should read as corrected below.

Column 1, line 14, strike out "and E. coli"; line 15, for "these" read -- this --; column 3, line 73, for "sterptomycin" read -- streptomycin --; column 4, lines 7 and 8, for "linocolnensis", in italics, read -- lincolnensis --, in italics; same column 4, line 74 and column 5, line 4, for "assey", each occurrence, read -- assay --; column 7, line 10, for "1300 M)" read -- 1300 (M) --; column 8, lines 3 and 4, for "medum" read -- medium --; line 6, for "agueous" read -- aqueous --; line 39, for "solid." read -- solid, --.

Signed and sealed this 18th day of February 1969.

(SEAL)
Attest:

Edward M. Fletcher, Jr.                                            EDWARD J. BRENNER
Attesting Officer                                                    Commissioner of Patents